United States Patent
Kim et al.

(10) Patent No.: US 11,210,328 B2
(45) Date of Patent: Dec. 28, 2021

(54) APPARATUS AND METHOD FOR LEARNING NARRATIVE OF DOCUMENT, AND APPARATUS AND METHOD FOR GENERATING NARRATIVE OF DOCUMENT

(71) Applicant: NCSOFT Corporation, Seoul (KR)

(72) Inventors: Hyung Jun Kim, Seongnam-si (KR); Hyung Jong Noh, Seongnam-si (KR); Yeon Soo Lee, Seongnam-si (KR); Jung Sun Jang, Seongnam-si (KR)

(73) Assignee: NCSOFT Corporation, Seoul (KR)

( * ) Notice: Subject to any disclaimer, the term of this patent is extended or adjusted under 35 U.S.C. 154(b) by 845 days.

(21) Appl. No.: 15/852,303

(22) Filed: Dec. 22, 2017

(65) Prior Publication Data

US 2018/0189387 A1  Jul. 5, 2018

(30) Foreign Application Priority Data

Dec. 29, 2016 (KR) .................. 10-2016-0182290

(51) Int. Cl.
*G06F 16/30* (2019.01)
*G06F 16/35* (2019.01)
*G06F 16/93* (2019.01)
*G06F 16/38* (2019.01)
*G06F 40/30* (2020.01)
*G06F 40/205* (2020.01)

(52) U.S. Cl.
CPC ........... *G06F 16/358* (2019.01); *G06F 16/35* (2019.01); *G06F 16/381* (2019.01); *G06F 16/93* (2019.01); *G06F 40/205* (2020.01); *G06F 40/30* (2020.01)

(58) Field of Classification Search
CPC ........ G06F 16/35; G06F 40/205; G06F 40/30; G06F 16/358; G06F 16/93
See application file for complete search history.

(56) References Cited

U.S. PATENT DOCUMENTS

| | | | |
|---|---|---|---|
| 7,392,175 B2 * | 6/2008 | Kawatani | ......................... 704/9 |
| 7,562,066 B2 * | 7/2009 | Kawatani | ............ G06F 16/3347 |
| 2008/0270361 A1 * | 10/2008 | Meyer | ..................... G06F 16/38 |
| 2009/0112588 A1 * | 4/2009 | Kummamuru | .......... G10L 15/04 704/245 |
| 2012/0203584 A1 * | 8/2012 | Mishor | .................. G06Q 30/02 705/7.11 |

(Continued)

OTHER PUBLICATIONS

Article entitled "TopicTiling: A Text Segmentation Algorithm based on LDA", by Riedl et al., dated Jul. 14, 2012.*

(Continued)

*Primary Examiner* — Mahesh H Dwivedi
(74) *Attorney, Agent, or Firm* — Sughrue Mion, PLLC

(57) ABSTRACT

Disclosed are an apparatus and method for learning a narrative of a document, and an apparatus and method for generating a narrative of a document. According to an embodiment of the present disclosure, the narrative learning method includes the steps of receiving a plurality of documents, generating a topic database which includes one or more topics and words related to each of the one or more topics from the plurality of documents, splitting each of the plurality of documents into one or more segments including one or more sentences by using the topic database, grouping the segments split from each of the plurality of documents into one or more clusters, and generating a cluster label for each of the one or more clusters.

21 Claims, 10 Drawing Sheets

(56) References Cited

U.S. PATENT DOCUMENTS

| | | | | |
|---|---|---|---|---|
| 2015/0006531 | A1* | 1/2015 | Deshpande | G06F 16/783 |
| | | | | 707/737 |
| 2017/0116204 | A1* | 4/2017 | Davulcu | G06F 16/355 |
| 2017/0270098 | A1* | 9/2017 | Liu | G06F 40/30 |
| 2018/0011843 | A1* | 1/2018 | Lee | G06F 40/51 |
| 2018/0159804 | A1* | 6/2018 | Wei | G06F 40/295 |

OTHER PUBLICATIONS

Article entitled "Multi-Document Summarization Using Sentence Clustering", by Gupta et al., dated Dec. 29, 2012.*
Article entitled "Topic Segmentation and Labeling in Asynchronous Conversations", by Joty et al., dated Jul. 2013.*
Article entitled "A Segment-based Approach to Clustering Multi-Topic Documents", by Tagarelli et al., dated Aug. 22, 2012.*
Article entitled "Topic Segmentation with an Aspect Hidden Markov Model", by Biei et al., dated Sep. 12, 2011.*
Article entitled "A Study on the Use of Word Embeddings and PageRank for Vietnamese Text Summarization", by Phung et al., dated Dec. 9, 2015.*
Article entitled "TSGVi: a graph-based summarization system for Vietnamese documents", by Hoang et al., dated 2012.*
Article entitled "Semantic Web Search Results Clustering Using Lingo and WordNet", by Sameh et al., dated Jun. 2010.*

* cited by examiner

FIG. 2

| Topic 1 | Topic 2 | Topic 3 | ... | Topic k |
|---|---|---|---|---|
| human | evolution | disease | | computer |
| genome | evolutionary | host | | models |
| dna | species | bacteria | | information |
| genetic | organisms | diseases | | data |
| genes | life | resistance | ... | computers |
| sequence | origin | bacterial | | system |
| sequence | biology | new | | network |
| gene | groups | strains | | systems |
| molecular | phylogenetic | controls | | model |
| ⋮ | ⋮ | ⋮ | | ⋮ |

The Boston Celtics struggled to stop the Indiana Pacers during the early goings of Thursday night's matchup in Indy, as the Pacers hit 10-of-18 shots during the first quarter and built up a 31-22 lead through the opening 12 minutes.
However, it didn't take long for Boston's defense to find its footing.
The Celtics opened up the second frame on fire, as they went off on a 17-0 run during the first five minutes of the quarter.
Marcus Smart's free throws at the 7:57 mark put Boston up 33-31, and the C's never trailed again after that point, as they capped off their three-game, road trip sweep with a 109-102 win at Bankers Life Fieldhouse.
The Celtics outscored Indiana 29-9 during the second quarter, as they limited the Pacers to just 3-of-21 (14.3 percent) shooting during the frame.
Indiana was fortunate to even get off 21 shots during those 12 minutes, as Boston forced the Pacers to turn the ball over seven times during the second quarter alone.

320 — The Boston Celtics struggled to stop the Indiana Pacers during the early goings of Thursday night's matchup in Indy, as the Pacers hit 10-of-18 shots during the opening 12 minutes.

330 — However, it didn't take long for Boston's defense to find its footing.

340 — The Celtics opened up the second frame on fire, as they went off on a 17-0 run during the first five minutes of the quarter. Marcus Smart's free throws at the 7:57 mark put Boston up 33-31, and the C's never trailed again after that point, as they capped off their three-game, road trip sweep with a 109-102 win at Bankers Life Fieldhouse.

350 — The Celtics outscored Indiana 29-9 during the second quarter, as they limited the Pacers to just 3-of-21 (14.3 percent) shooting during the frame. Indiana was fortunate to even get off 21 shots during those 12 minutes, as Boston forced the Pacers to turn the ball over seven times during the second quarter alone.

The Boston Celtics struggled to stop the Indiana Pacers during the early goings of Thursday night's matchup in Indy, as the Pacers hit 10-of-16 shots during the first quarter and built up a 31-22 lead through the opening 12 minutes.
However, it didn't take long for Boston's defense to find its footing.
The Celtics opened up the second frame on fire, as they went off on a 17-0 run during the first five minutes of the quarter.
Marcus Smart's free throws at the 7:57 mark put Boston up 33-31, and the C's never trailed again after that point, as they capped off their three-game, road trip sweep with a 109-102 win at Bankers Life Fieldhouse.
The Celtics outscored Indiana 29-9 during the second quarter, as they limited the Pacers to just 3-of-21 (14.3 percent) shooting during the frame.
Indiana was fortunate to even get off 21 shots during those 12 minutes, as Boston forced the Pacers to turn the ball over seven times during the second quarter alone.

⇧

720 — The Boston Celtics struggled to stop the Indiana Pacers during the early goings of Thursday night's matchup in Indy, as the Pacers hit 10-of-16 shots during the first quarter and built up a 31-22 lead through the opening 12 minutes.

730 — However, it didn't take long for Boston's defense to find its footing.

740 — The Celtics opened up the second frame on fire, as they went off on a 17-0 run during the first five minutes of the quarter.
Marcus Smart's free throws at the 7:57 mark put Boston up 33-31, and the C's never trailed again after that point, as they capped off their three-game, road trip sweep with a 109-102 win at Bankers Life Fieldhouse.

750 — The Celtics outscored Indiana 29-9 during the second quarter, as they limited the Pacers to just 3-of-21 (14.3 percent) shooting during the frame.
Indiana was fortunate to even get off 21 shots during those 12 minutes, as Boston forced the Pacers to turn the ball over seven times during the second quarter alone.

⇧ ⇧ ⇧ ⇧

760
L1
L4
L7
L2

APPARATUS AND METHOD FOR LEARNING NARRATIVE OF DOCUMENT, AND APPARATUS AND METHOD FOR GENERATING NARRATIVE OF DOCUMENT

CROSS-REFERENCE TO RELATED APPLICATION

This application claims priority to and the benefit of Korean Patent Application No. 10-2016-0182290, filed on Dec. 29, 2016, the disclosure of which is incorporated herein by reference in its entirety.

BACKGROUND

1. Field

Embodiments of the present disclosure are directed to technologies of learning and generating a narrative of a document.

2. Discussion of Related Art

Recently, automatic sentence generation using a machine has been actively studied in a natural language processing field such as statistical machine translation, document summarization, paraphrasing, etc. and an field such as media and education. In particular, robot journalism has been on the rise in the media field, and has been utilized to automatically write an article in a publication such as the AP, the LA Times, and the like.

Robot journalism refers to an article automatically written by computer software or journalism focused on the article. To write an article, software used in robot journalism collects and manages all sorts of data on the Internet and then applies an algorithm for clustering and semantic parsing to the data.

Generally, in robot journalism and similar natural language document generation technologies, raw data needed for generating a document is collected and transformed into a form understandable and parsable by the algorithm, and then a series of events to be included in the document are found and used to write the document. In this case, in order to write a document based on a series of events found in data, a typical flow of the document (i.e. a narrative) is previously designed, and sentences describing the events are generated and arranged in accordance with the designed flow. However, in this case, there is a problem of making a flow of the generated document be formal since the document is generated in accordance with the previously designed flow.

SUMMARY

Embodiments of the present disclosure provide an apparatus and method of learning a narrative of a document, and an apparatus and method of generating a narrative of a document.

According to an aspect of the present disclosure, there is provided a method for learning a narrative of a document performed in a computing device including one or more processors and a memory storing one or more programs to be executed by the one or more processors, the method including: receiving a plurality of documents; generating a topic database which includes one or more topics and words related to each of the one or more topics from the plurality of documents; splitting each of the plurality of documents into one or more segments including one or more sentences by using the topic database; grouping the segments split from each of the plurality of documents into one or more clusters; and generating a cluster label for each of the one or more clusters.

The generating of the topic database may include generating the topic database by using a topic modeling technique.

The splitting may include generating a topic vector for each sentence included in each of the plurality of documents by using the topic database; and splitting each of the plurality of documents into the one or more segments by using the topic vector.

The generating of the topic vector may include generating the topic vector by using an appearance frequency of words that belong to each of the one or more topics in each of the sentences.

The splitting may include splitting the plurality of documents into one or more segments based on a topic vector similarity between adjacent sentences in each of the plurality of documents.

The grouping may include generating a segment vector for each of the split segments and grouping the split segments into one or more clusters by using the segment vector.

The grouping may include grouping the split segments into one or more clusters based on a segment vector similarity between the split segments.

The generating of the cluster label may include generating the cluster label for each grouped cluster from the segments included in each grouped cluster.

The generating of the cluster label may include generating the cluster label for each of the grouped clusters from the segments included in each of the grouped clusters.

According to another aspect of the present disclosure, there is provided a method for generating a narrative of a document performed in a computing device including one or more processers and a memory storing one or more programs to be executed by the one or more processors, the method including: receiving a document; splitting the document into one or more segments including one or more sentences by using a topic database which includes one or more topics and words related to each of the one or more topics; grouping each of the one or more segments into one of one or more clusters by using a cluster database which includes at least one of a cluster label for each of the one or more clusters and segments previously collected and grouped into the one or more clusters; and generating a label sequence for the one or more segments in accordance with the cluster labels for the grouped clusters.

The splitting my include generating a topic vector for each sentence included in the document by using the topic database; and splitting the document into the one or more segments by using the topic vector.

The generating of the topic vector may include generating the topic vector by using an appearance frequency of words that belong to each of the one or more topics in each of the sentences.

The splitting may compromise splitting the document into one or more segments based on a topic vector similarity between adjacent sentences in the document.

The grouping may include generating a segment vector for each of the one or more segments; and grouping each of the one or more segments into the one or more clusters by using the segment vector.

The grouping may include grouping each of the one or more segments into one or more clusters based on a segment vector similarity between each of the one or more segments and the previously collected segments.

According to another aspect of the present disclosure, there is provided an apparatus for learning a narrative of a document, the apparatus including: an inputter configured to receive a plurality of documents; a topic parser configured to generate a topic database including one or more topics and words related to each of the one or more topics from the plurality of documents; a topic storage configured to store the topic database; a splitter configured to split each of the plurality of documents into one or more segments including one or more sentences by using the topic database; a clusterer configured to group the segments split from each of the plurality of documents into one or more clusters; a labeler configured to generate a cluster label for each of the one or more clusters; and a cluster storage configured to store a cluster database including at least one of the cluster label for each of the one or more clusters and the segments grouped into the one or more clusters.

The topic parser may be configured to generate the topic database by using a topic modeling technique.

The splitter may be configured to generate a topic vector for each of the sentences included in each of the plurality of documents by using the topic database and split each of the plurality of documents into the one or more segments by using the topic vector.

The splitter may be configured to generate the topic vector by using an appearance frequency of words that belong to each of the one or more topics in each of the sentences.

The splitter may be configured to split the plurality of documents into one or more segments based on a topic vector similarity between adjacent sentences in each of the plurality of documents.

The clusterer may be configured to generate a segment vector for each of the split segments and groups the split segments into the one or more clusters by using the segment vector.

The clusterer may be configured to group the split segments into one or more clusters based on segment vector similarity between the split segments.

The labeler may be configured to generate the cluster label for each of the grouped clusters from the segments included in each of the grouped clusters.

According to another aspect of the present disclosure, there is provided an apparatus for generating a narrative of a document, the apparatus including: an inputter configured to receive a document; a topic storage configured to store a topic database including one or more topics and words related to each of the one or more topics; a splitter configured to split the document into one or more segments including one or more sentences by using the topic database; a cluster storage configured to store a cluster database including at least one of a cluster label for each of one or more clusters and segments previously collected and grouped into the one or more clusters; a clusterer configured to group the one or more segments into the one or more clusters; and a narrative generator configured to generate a label sequence for the one or more segments in accordance with the cluster labels for the grouped clusters.

The splitter may be configured to generate a topic vector for each sentence included in the document by using the topic database and split the document into the one or more segments by using the topic vector.

The splitter may be configured to generate the topic vector by using an appearance frequency of words that belong to each of the one or more topics in each of the sentences.

The splitter may be configured to split the document into one or more segments based on a topic vector similarity between adjacent sentences in the document.

The clusterer may be configured to generate a segment vector for each of the one or more segments and groups each of the one or more segments into one or more clusters based on the segment vector.

The clusterer may be configured to group each of the one or more segments into one or more clusters based on a segment vector similarity between each of the one or more segments and the previously collected segments.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which:

FIG. 2 is a view of showing an example of a topic database according to an embodiment of the present disclosure;

FIG. 3 is a view of showing an example of a segment split according to an embodiment of the present disclosure;

FIG. 7 is a view of showing an example of a label sequence according to an embodiment of the present disclosure;

DETAILED DESCRIPTION OF EXEMPLARY EMBODIMENTS

Embodiments of the present disclosure will be described below with reference to accompanying drawings. The detailed descriptions set forth herein are provided for a better comprehensive understanding of a method, apparatus, and/or system described in this specification. However, these descriptions are nothing but examples and are not to be construed as limiting the present disclosure.

In descriptions of the embodiments of the present disclosure, detailed descriptions about a publicly known art related to the present disclosure will be omitted when it is determined that the detailed descriptions obscure the gist of the present disclosure. Further, terms used herein, which are defined by taking the functions of the present disclosure into account, may vary depending on users, intention or convention of an operator, etc. Therefore, the definition should be based on the content given throughout the specification. The terms in the detailed descriptions are used only for describing the embodiments of the present disclosure and are not restrictively used. Unless otherwise indicated, terms having a singular form also have a plural meaning. In the present disclosure, expressions such as "include" or "have" indicate the inclusion of certain features, numerals, steps, operations, elements, or a combination thereof, and are not to be construed as excluding the presence or possibility of one or more other certain features, numerals, steps, operations, elements, or a combination thereof.

A narrative refers to a concept that comprehensively includes a structural form, a strategy, and the like of describing and representing a series of events. Embodiments of the present disclosure are directed to collecting a massive document and learning a structure of a narrative that an individual document has, and generating a structure of a narrative that a new document will have by using a learning result when the new document is input.

Figure 1:
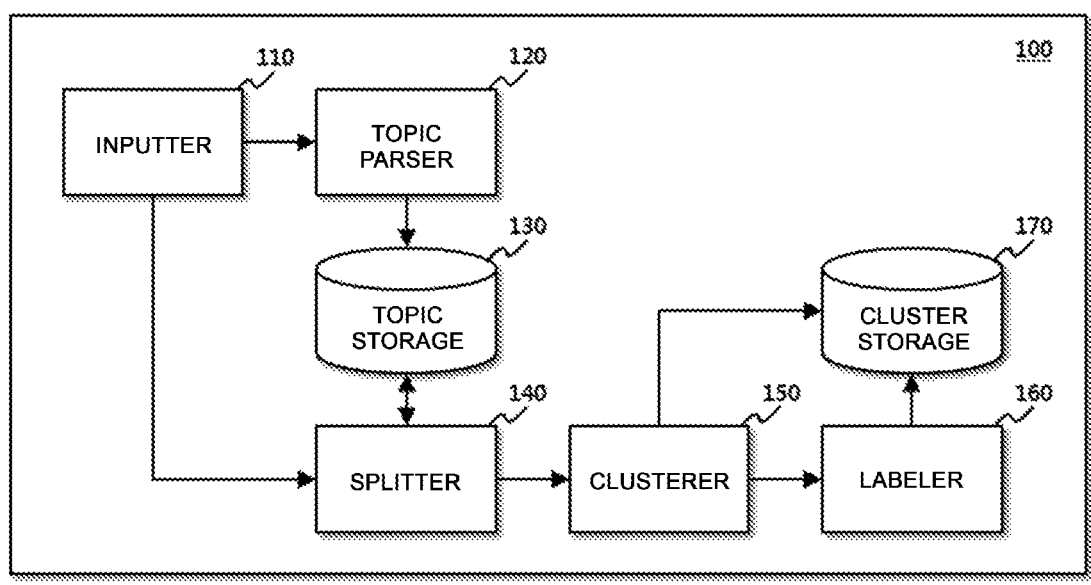
FIG. 1 is a diagram of a narrative learning apparatus according to an embodiment of the present disclosure.

FIG. 1 is a diagram of a narrative learning apparatus according to an embodiment of the present disclosure.

Referring to FIG. 1, a narrative learning apparatus 100 according to an embodiment of the present disclosure includes an inputter 110, a topic parser 120, a topic storage 130, a splitter 140, a clusterer 150, a labeler 160, and a cluster storage 170.

The inputter 110 receives a plurality of documents.

For example, according to embodiments of the present disclosure, the document may include essays written on a social network service (SNS), blog, and the like, and Internet articles, treatises, and the like, but is not limited to a specific kind and form as long as the document can be written in an electric form by a computer or similar device capable of processing information, transceived or stored, and include one or more natural-language sentences.

The topic parser 120 generates a topic database, which includes one or more topics and words related to each of the topics, from a plurality of input documents.

According to an embodiment of the present disclosure, the topic parser 120 may use a topic modeling technique to generate the topic database from the plurality of input documents.

In this case, topic modeling refers to a statistical inference model that infers a structure of a document by expressing one document as a stochastic mixture of topics and expressing each of the topics as a distribution of words. A latent Dirichlet allocation (LDA) algorithm is a representative example of a topic modeling technique. However, the topic modeling technique used in this embodiment of the present disclosure is not limited to the LDA algorithm and various publicly known topic modeling techniques may be used.

Moreover, according to an embodiment, the topic parser 120 may perform preprocesses such as removing meaningless stopwords, for example, an hypertext mark-up language (HTML) tag, an article, a demonstrative pronoun, and the like, before generating the topic database from the plurality of input documents.

FIG. 2 is a view of showing an example of a topic database according to an embodiment of the present disclosure. As shown in FIG. 2, the topic database may include k topics extracted from the plurality of input documents and a set of words related to each of the topics. In this case, the number of topics extracted by the topic parser 120 may be previously set by a user.

Moreover, the topic storage 130 stores the topic database generated by the topic parser 120.

The splitter 140 splits each of the input documents into one or more segments including one or more sentences by using the topic database.

Specifically, FIG. 3 is a view of showing an example of a segment split according to an embodiment of the present disclosure.

As shown in FIG. 3, each of input documents 310 may include one or more sentences, and the splitter 140 may split the input document 310 into one or more segments 320, 330, 340, and 350 including one or more sentences.

Moreover, according to an embodiment of the present disclosure, the splitter 140 uses the topic database to generate a topic vector for each sentence included in each of the input documents, and uses the generated topic vector to split each of the documents into one or more segments.

Figure 4:
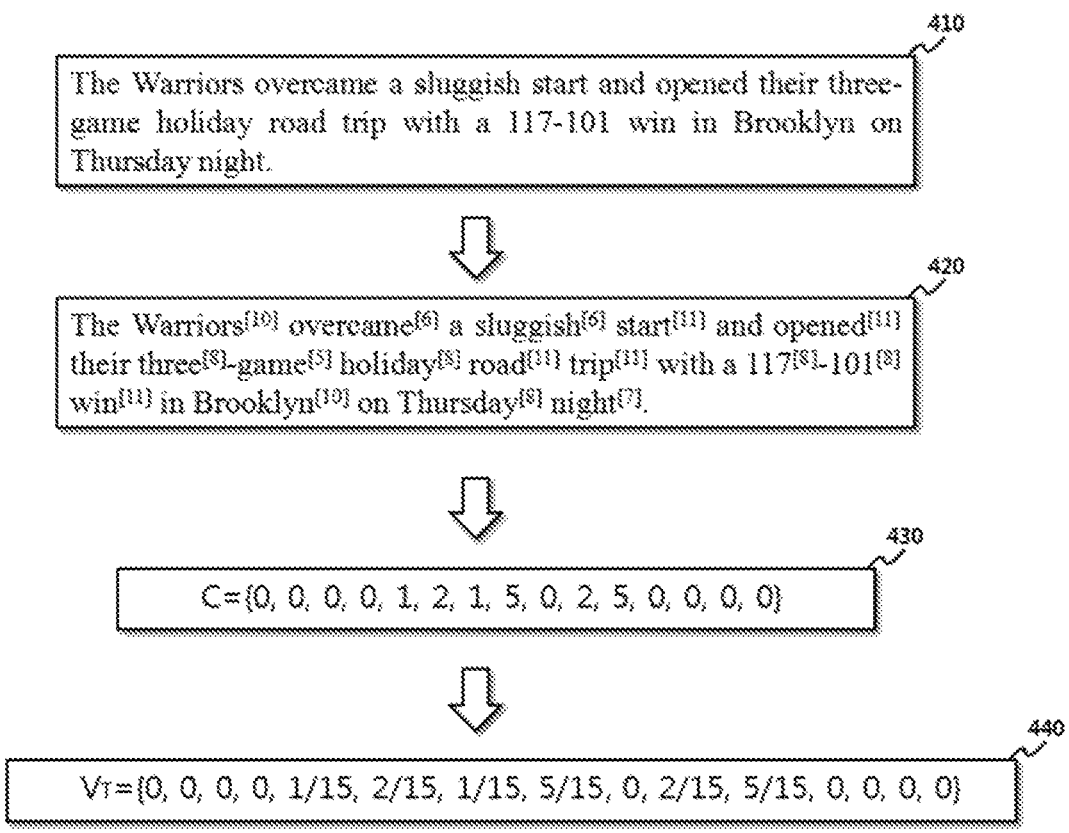
FIG. 4 is a view of showing an example of topic vector generation according to an embodiment of the present disclosure.

FIG. 4 is a view of showing an example of topic vector generation according to an embodiment of the present disclosure;

Referring to FIG. 4, the splitter 140 parses words included in the topic database and a topic related to each word in a sentence 410 included in the input document. Specifically, referring to a box 420, numerals superscripted to words refer to topics related to the words. That is, "Warriors" is a word included in a tenth topic among k topics included in the topic database, and "overcame" is a word included in a sixth topic thereof.

Moreover, the splitter 140 may calculate an appearance frequency of the words related to the k topics in the sentence 410, and generate topic vectors for the sentence 410.

For example, the appearance frequency C of the words related to the k topics included in the topic database within one sentence 410 may be represented as shown in the following expression 1.

$$C=\{C_1,C_2,C_3,C_4,\ldots,C_k\} \quad \text{[Expression 1]}$$

That is, when it is assumed that the number of topics included in the topic database is 15, as in the illustrated example, an appearance frequency of the words related to the topics within the sentence 410 is represented by a box 430 of FIG. 4. Moreover, a topic vector $V_T$ may be generated by the following expression 2.

$$V_T=C/k \quad \text{[Expression 2]}$$

In the illustrated example, the topic vector generated from the sentence 410 may be represented in a box 440 according to the expression 2.

Moreover, since the method of generating the topic vector is not necessarily limited to the above example, a variety of methods of generating a vector corresponding to each sentence by using information included in a topic database besides the above example may exist.

Moreover, according to an embodiment of the present disclosure, the splitter 140 may split each of the documents into a plurality of segments based on a topic vector similarity between adjacent sentences in each of the input documents.

For example, the splitter 140 calculates cosine similarity of a topic vector between adjacent sentences with regard to the sentences included in the documents, and splits each of the documents into one or more segments with respect to a point at which the calculated cosine similarity is less than or equal to a preset reference value. Moreover, since the segment splitting method using the topic vector is not necessarily limited to the above example, a variety of methods based on a similarity between topic vectors besides the above example may exist.

Moreover, the clusterer 150 groups the segments split from each of the plurality of input documents into one or more clusters.

According to an embodiment of the present disclosure, the clusterer 150 generates the segment vector for each of the segments split from the documents by the splitter 140, and employs the generated segment vector to group the segments into one or more clusters.

For example, in this case, the segment vector may refer to a vector characterizing a corresponding segment based on the words included in the segment.

For example, the clusterer 150 may generate segment vectors for segments split through various methods such as a topic modeling method, a term frequency-inverse document frequency (TF-IDF) method, a word embedding method, and the like. However, the segment vector generation method is not necessarily limited to the above example, and the clusterer 150 may generate the segment vector through a variety of methods of using words included in segments to generate vectors having the same magnitude for the segments.

Moreover, the split segments may be grouped into one or more clusters based on a segment vector similarity between the segments. Specifically, the clusterer 150 may use various clustering algorithms, for example, K-means clustering algorithm, an affinity propagation algorithm, and the like to group the segments into one or more clusters.

The labeler 160 generates a cluster label for each cluster grouped by the clusterer 150.

Figure 5:
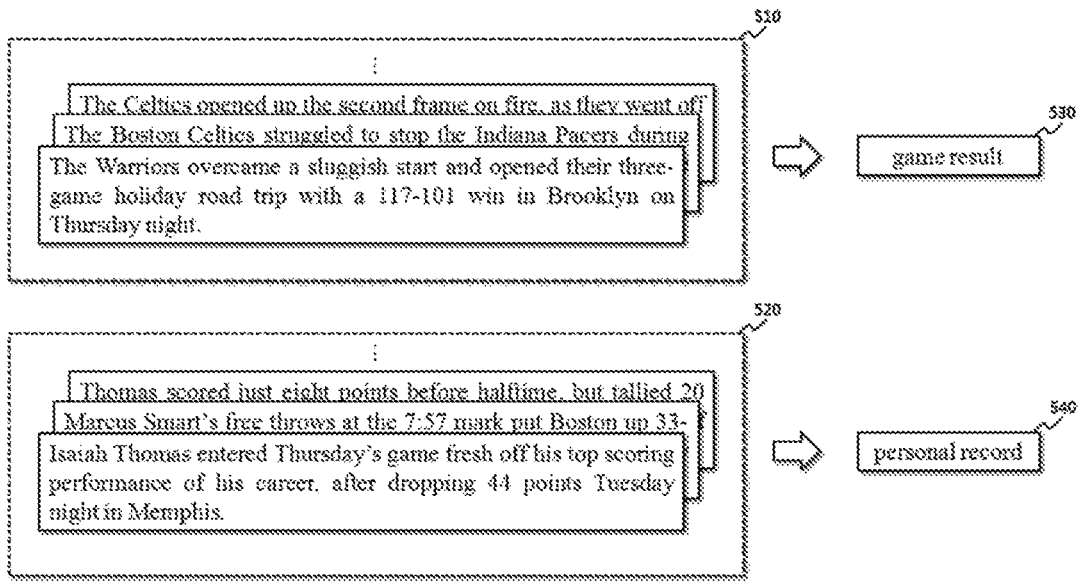
FIG. 5 is a view of showing an example of a cluster label generated according to an embodiment of the present disclosure.

FIG. 5 is a view of showing an example of a cluster label generated according to an embodiment of the present disclosure.

Referring to FIG. 5, each of clusters 510 and 520 includes segments grouped by the clusterer 150. The labeler 160 may generate cluster labels 530 and 540 with one or more words from the segments included in each of the clusters 510 and 520.

In this case, according to an embodiment of the present disclosure, the labeler 160 may extract one or more words included in segments grouped into a cluster from the segments on the basis of an appearance frequency of each of the words for each cluster and generate a cluster label for each of the clusters as a combination of the extracted words.

For example, the labeler 160 may generate the cluster label for each of the clusters by combining one or more words having a high appearance frequency based on the appearance frequencies of the words included in the segments of the cluster.

Alternatively, the labeler 160 may generate the cluster label for each of the clusters by combining words having the highest simultaneous appearance frequency based on simultaneous appearance frequencies of two or more words among the words included in the segments of the cluster.

Alternatively, the labeler 160 may group words included in the segments of the cluster into synonyms or hypernyms based on a previously stored or externally provided lexicon and generate the cluster label for each of the clusters by combining synonyms or hypernyms which have the highest appearance frequency.

Moreover, since the cluster label generation method is not necessarily limited to the above example, a variety of publicly known labeling methods may be used in addition to the above example.

The cluster storage 170 stores a cluster database including at least one of the cluster labels for each of the one or more clusters and the segments grouped into one or more clusters.

Moreover, according to an embodiment, the narrative learning apparatus 100 may be implemented in a computing device that includes at least one processor and a computer readable recording medium connected to the processor. The computer readable recording medium may be internally or externally provided in the processor and connected to the processor by various well-known means. The processor in the computing device may make the computing device operate according to exemplified embodiments described in this specification. For example, the processor may execute an instruction stored in the computer readable recording medium, and the instruction stored in the computer readable recording medium may be configured to make the computing device operate according to the exemplified embodiments described in this specification when executed by the processor.

Figure 6:
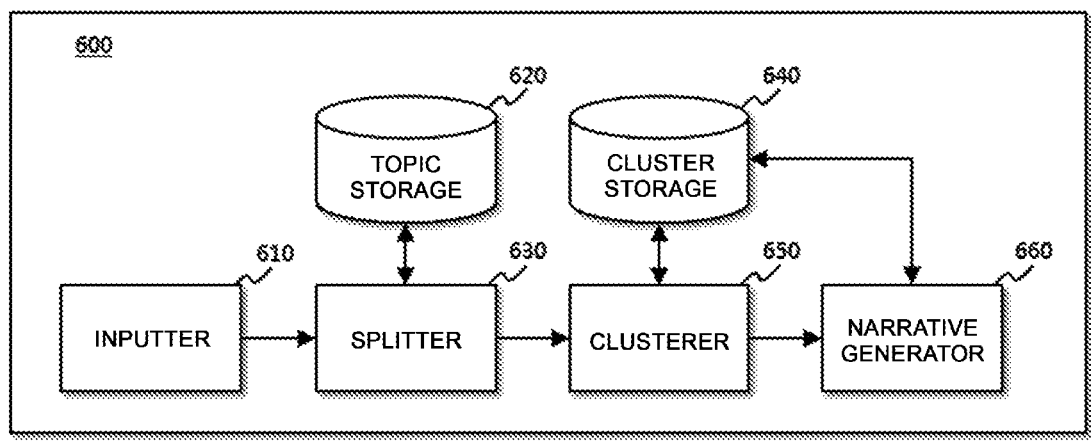
FIG. 6 is a diagram of a narrative generation apparatus according to an embodiment of the present disclosure.

FIG. 6 is a diagram of a narrative generation apparatus according to an embodiment of the present disclosure.

Referring to FIG. 6, according to an embodiment of the present disclosure, a narrative generation apparatus 600 includes an inputter 610, a topic storage 620, a splitter 630, a cluster storage 640, a clusterer 650, and a narrative generator 660.

The inputter 610 receives an input document to be subjected to narrative generation.

The topic storage 620 stores a topic database. In this case, the topic database may include one or more topics and one or more words related to each of the topics. Further, for example, the topic database may be a topic database previously generated by and stored in the narrative learning apparatus 100.

The splitter 630 splits the input document into one or more segments by using the topic database stored in the topic storage 620.

In this case, the segment split by the splitter 630 may be performed in the same manner as that of the splitter 140 of the above narrative learning apparatus 100.

The cluster storage 640 stores a cluster database. In this case, the cluster database may include at least one of a cluster label for each of one or more clusters and segments previously collected and grouped into each of the clusters. Further, the cluster database stored in the cluster storage 640 may be a cluster database previously generated by and stored in the narrative learning apparatus 100.

The clusterer 650 groups each of the segments split by the splitter 630 into one of one or more clusters included in the cluster database.

According to an embodiment of the present disclosure, the clusterer 650 generates a segment vector for each of the split segments and groups each of the segments into one or more clusters included in the cluster database based on the generated segment vector.

In this case, for example, the segment vector may be generated through various methods such as a topic modeling method, a TF-IDF method, a word embedding method, and the like.

Specifically, the clusterer 650 may group the split segments into one of one or more clusters included in the cluster database based on a segment vector similarity between the each of the split segments and the segments included in the cluster database.

In this case, various publicly known clustering algorithms, for example, a K-means clustering algorithm, an affinity propagation algorithm, and the like may be used to group the split segments.

Moreover, the clusterer 650 may add each of the grouped segments to the cluster database stored in the cluster storage 640 in accordance with clustering results of the split segments.

The narrative generator 660 generates a label sequence for the split segments in accordance with the cluster labels for the clusters to which the split segments are grouped.

Specifically, FIG. 7 is a view of showing an example of a label sequence according to an embodiment of the present disclosure.

As shown in FIG. 7, when segments 720, 730, 740, and 750 split from an input document 710 are grouped into clusters with cluster labels L1, L4, L7, and L2, the narrative generator 660 may generate a label sequence 760 for the split segments 720, 730, 740, and 750 in accordance with the cluster labels L1, L4, L7, and L2, and this label sequence 760 refers to a narrative of the input document.

Moreover, according to an embodiment, the narrative generation apparatus 600 may be implemented in a computing device that includes at least one processor and a computer readable recording medium connected to the processor. The computer readable recording medium may be internally or externally provided in the processor and connected to the processor by various well-known means. The processor in the computing device may make each computing device operate according to the exemplified embodiments described in this specification. For example, the processor may execute an instruction stored in the computer readable recording medium, and the instruction stored in the computer readable recording medium may be configured to make the computing device operate according to the exemplified embodiments described in this specification when executed by the processor.

Moreover, in the above examples, the narrative learning apparatus 100 and the narrative generation apparatus 600 were described as being separate apparatuses, but are not limited thereto. Alternatively, the narrative learning apparatus 100 and the narrative generation apparatus 500 may be implemented in a single computing device according to embodiments.

Figure 8:
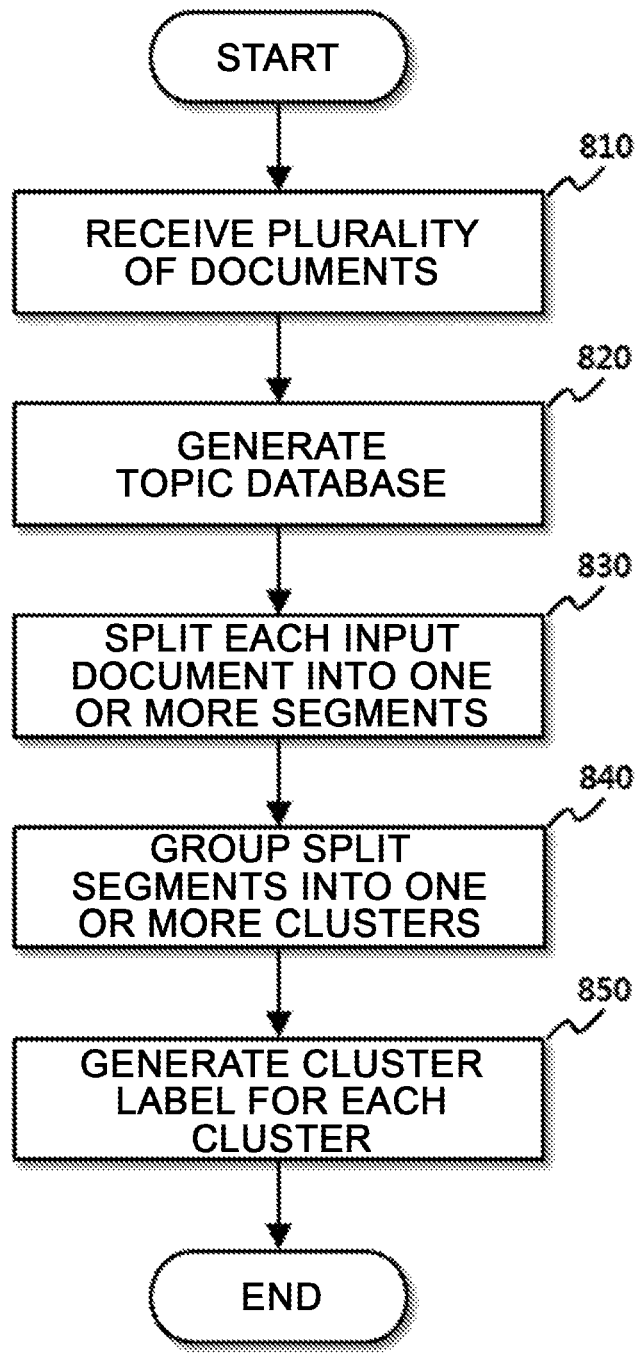
FIG. 8 is a flowchart of a narrative learning method according to an embodiment of the present disclosure.

FIG. 8 is a flowchart of a narrative learning method according to an embodiment of the present disclosure.

For example, the method shown in FIG. 8 may be performed by the narrative learning apparatus 100 shown in FIG. 1.

Moreover, the flowchart shown in FIG. 8 shows the method being divided into a plurality of steps, but at least some of the steps may be reordered, performed in combination with other steps, omitted, divided into sub steps, or performed with one or more added steps (not shown).

Referring to FIG. 8, first, the narrative learning apparatus 100 receives a plurality of input documents (810).

Then, the narrative learning apparatus 100 generates a topic database including one or more topics and words related to each of the one or more topics from the plurality of input documents (820).

Then, the narrative learning apparatus 100 splits each of the plurality of documents into one or more segments including one or more sentences by using the topic database (830).

Then, the narrative learning apparatus 100 groups the segments split from each of the plurality of documents into one or more clusters (840).

Then, the narrative learning apparatus 100 generates cluster labels for the one or more clusters (850).

Figure 9:
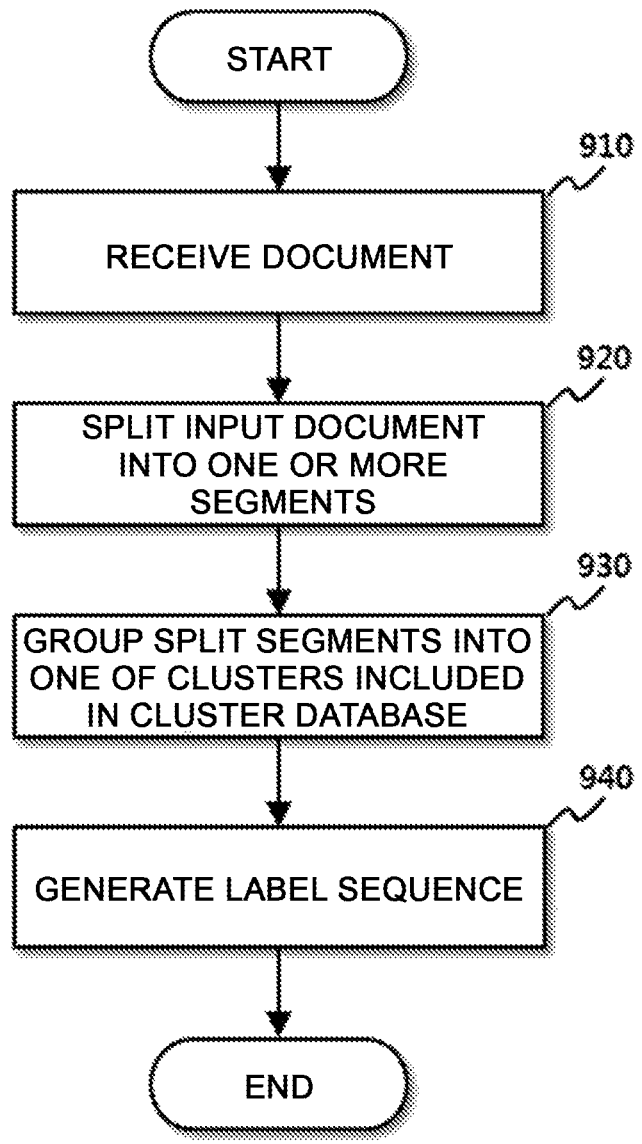
FIG. 9 is a flowchart of a narrative generation method according to an embodiment of the present disclosure.

FIG. 9 is a flowchart of a narrative generation method according to an embodiment of the present disclosure.

For example, the method shown in FIG. 9 may be performed by the narrative generation apparatus 600 shown in FIG. 6.

Moreover, the flowchart of FIG. 9 shows the method being divided into a plurality of steps, but at least some of the steps may be reordered, performed in combination with other steps, omitted, divided into sub steps, or performed with one or more added steps (not shown).

Referring to FIG. 9, first, the narrative generation apparatus 600 receives an input document (910).

Then, the narrative generation apparatus 600 splits the input document into one or more segments including one or more sentences by using a topic database including one or more topics and words related to the one or more topics (920).

Then, the narrative generation apparatus 600 groups the one or more segments into one of one or more clusters included in a cluster database by using the cluster database including at least one of cluster labels for the one or more clusters and segments previously collected and grouped into one or more clusters (930).

Then, the narrative generation apparatus 600 generates a label sequence for the one or more segments in accordance with the cluster labels for the grouped clusters (940).

Figure 10:
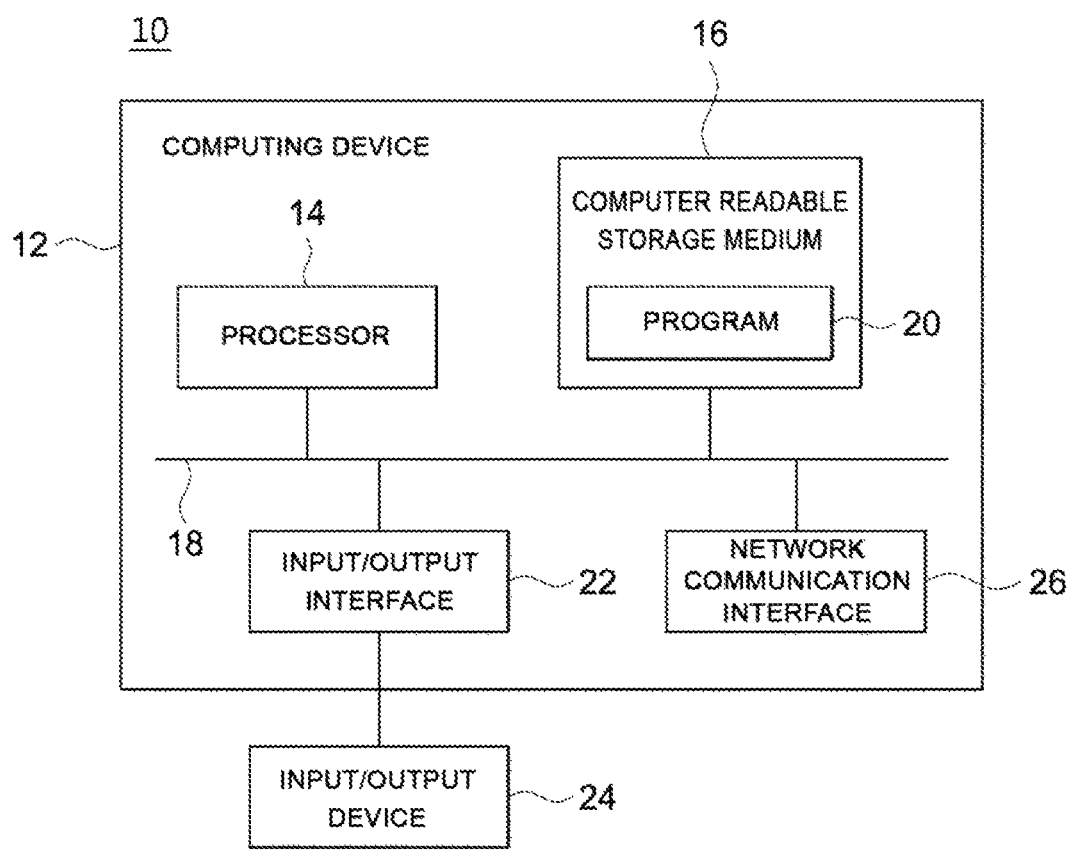
FIG. 10 is a block diagram for exemplifying and explaining a computing environment including a computing device suitable for use in exemplified embodiments of the present disclosure.

FIG. 10 is a block diagram for exemplifying and explaining a computing environment 10 including a computing device suitable for use in the exemplified embodiments. In the illustrated embodiments, components may have functions and abilities different from those of the following descriptions, and another component may exist in addition to those described in the following embodiments.

The illustrated computing environment 10 includes a computing device 12. According to an embodiment, the computing device 12 may be the narrative learning apparatus 100 or the narrative generation apparatus 600 according to the embodiments of the present disclosure. Alternatively, the computing device 12 may be a computing device in which both the narrative learning apparatus 100 and the narrative learning apparatus 500 according to the embodiments of the present disclosure are implemented.

The computing device 12 includes at least one processor 14, a computer readable storage medium 16, and a communication bus 18. The processor 14 may make the computing device 12 operate according to the above-mentioned exemplified embodiments. For example, the processor 14 may execute one or more programs stored in the computer readable storage medium 16. The one or more programs may include one or more computer executable instructions, and the computer executable instruction may be configured to make the computing device 12 operate according to the exemplified embodiments when executed by the processor 14.

The computer readable storage medium 16 is configured to store a computer executable instruction or program code, program data, and/or information having other suitable forms. A program 20 stored in the computer readable storage medium 16 includes an instruction set executable by the processor 14. According to an embodiment, the computer readable storage medium 16 may include a memory (i.e. a volatile memory such as a random access memory (RAM), and a nonvolatile memory, or proper combination thereof), one or more magnetic disk storage devices, optical disk storage devices, flash memory devices, other storage media accessed by the computing device 12 and capable of storing desired information, or a proper combination thereof.

The communication bus 18 connects various components of the computing device 12, such as the processor 14 and the computer readable storage medium 16, with each other.

The computing device 12 may also include one or more input/output interfaces 22 providing interfaces for one or more input/output devices 24, and one or more network communication interfaces 26. The input/output interface 22 and the network communication interface 26 are connected to the communication bus 18. The input/output device 24 may be connected to other components of the computing device 12 through the input/output interface 22. The exemplified input/output device 24 may include an input device such as a pointing device (e.g. a mouse, a trackpad, and the like), a keyboard, a touch input device (e.g. a touch pad, a touch screen, and the like), a voice or sound input device, various kinds of sensing devices, and/or a photographing device, and/or an output device such as a display device, a printer, a loudspeaker, and/or a network card. The exemplified input/output device 24 may be internally provided in the computing device 12 as a component of the computing device 12, or may be provided separately from the computing device 12 and connected to the computing device 12.

Moreover, an embodiment of the present disclosure may include a computer readable recording medium with a program to implement the methods described in this specification on a computer. The computer readable recording medium may include one or a combination of a program command, a local data file, a local data structure, and the like. The medium may be specially designed and configured for the present disclosure, or may be typically available in the computer software field. For example, the computer readable recording medium may include a magnetic medium such as a hard disk, a floppy disc and a magnetic tape; an optical recording medium such as a compact disc read-only memory (CD-ROM) and a digital versatile disc (DVD); a magnetic-optical medium such as a floppy disc; and a hardware device specially configured to store and execute a program command, such as a ROM, a RAM, a flash memory, and the like. For example, the program command may include not only a machine language code produced by a compiler, but also a high-level language code to be executable by a computer through an interpreter or the like.

According to embodiments of the present disclosure, it is possible to learn a narrative that each document has from a plurality of documents and parse and generate various narratives that various documents have according to learning results.

Further, according to embodiments of the present disclosure, since various narratives that various documents have are parsed and generated, it is possible to generate a document having not a formal narrative but diverse narratives when the document is automatically generated.

Although exemplary embodiments of the present disclosure have been described in detail, it should be appreciated by a person having ordinary skill in the art that various changes may be made to the above exemplary embodiments without departing from the scope of the present disclosure, and the scope is not limited to the above embodiments but is defined in the following claims and their equivalents.

What is claimed is:

1. A method for learning a narrative of a document performed in a computing device comprising one or more processors and a memory storing one or more programs to be executed by the one or more processors, the method comprising:
receiving a plurality of documents;
generating a topic database which comprises one or more topics and words related to each of the one or more topics from the plurality of documents;
splitting each of the plurality of documents into one or more segments comprising one or more sentences by using the topic database;
grouping the one or more segments split from each of the plurality of documents into one or more clusters; and
generating a cluster label for each of the one or more clusters,
wherein the grouping comprises:
generating a segment vector for each of the one or more segments by using a topic modeling method, the segment vector being a vector characterizing a corresponding segment based on words included in the corresponding segment; and
grouping the one or more segments into the one or more clusters based on a segment vector similarity between each of the one or more segments, and
wherein the generating of the cluster label comprises generating a cluster label for a cluster of the one or more clusters by combining words having a highest simultaneous appearance frequency, among words included in segments grouped into the cluster, based on simultaneous appearance frequencies of two or more words in one sentence.

2. The method of claim 1, wherein the generating of the topic database comprises generating the topic database by using a topic modeling technique.

3. The method of claim 1, wherein the splitting comprises:
generating a topic vector for each sentence included in each of the plurality of documents by using the topic database; and
splitting each of the plurality of documents into the one or more segments by using the topic vector.

4. The method of claim 3, wherein the generating of the topic vector comprises generating the topic vector by using an appearance frequency of words that belong to each of the one or more topics in each of the one or more sentences.

5. The method of claim 3, wherein the splitting comprises splitting the plurality of documents into the one or more segments based on a topic vector similarity between adjacent sentences in each of the plurality of documents.

6. The method of claim 1, wherein the generating the cluster label further comprises extracting one or more words included in the segments grouped into the cluster based on an appearance frequency of each word in the segments grouped into the cluster and generating the cluster label for the cluster based on the extracted one or more words.

7. The method of claim 1, wherein the generating the cluster label further comprises generating the cluster label for the cluster by combining two or more words having a high appearance frequency based on appearance frequencies of words included in the segments grouped into the cluster.

8. The method of claim 1, wherein the generating the cluster label further comprises grouping words included in segments of the cluster into synonyms or hypernyms based on a previously stored or externally provided lexicon and generating the cluster label for the cluster by combining synonyms or hypernyms which have a highest appearance frequency in the segments of the cluster.

9. A method for generating a narrative of a document performed in a computing device comprising one or more processors and a memory storing one or more programs to be executed by the one or more processors, the method comprising:
receiving a document;
splitting the document into one or more segments comprising one or more sentences by using a topic database which comprises one or more topics and words related to each of the one or more topics;
grouping each of the one or more segments into one of one or more clusters by using a cluster database which comprises at least one of a cluster label for each of the one or more clusters and segments previously collected and grouped into the one or more clusters; and
generating a label sequence for the one or more segments in accordance with cluster labels for the grouped one or more clusters, wherein the grouping comprises:
generating a segment vector for each of the one or more segments by using a topic modeling method, the segment vector being a vector characterizing a corresponding segment based on words included in the corresponding segment; and
grouping each of the one or more segments into the one or more clusters based on a segment vector similarity between each of the one or more segments and the previously collected segments, and
wherein each of the cluster labels for a corresponding cluster of the grouped one or more clusters is generated by combining words having a highest simultaneous appearance frequency, among words included in segments grouped into the corresponding cluster, based on simultaneous appearance frequencies of two or more words in one sentence.

10. The method of claim 9, wherein the splitting comprises:
generating a topic vector for each sentence included in the document by using the topic database; and
splitting the document into the one or more segments by using the topic vector.

11. The method of claim 10, wherein the generating of the topic vector comprises generating the topic vector by using an appearance frequency of words that belong to each of the one or more topics in each of the one or more sentences.

12. The method of claim 10, wherein the splitting comprises splitting the document into the one or more segments based on a topic vector similarity between adjacent sentences in the document.

13. An apparatus for learning a narrative of a document, the apparatus comprising one or more processors to implement:
an inputter configured to receive a plurality of documents;
a topic parser configured to generate a topic database comprising one or more topics and words related to each of the one or more topics from the plurality of documents;
a topic storage configured to store the topic database;
a splitter configured to split each of the plurality of documents into one or more segments comprising one or more sentences by using the topic database;
a clusterer configured to group the one or more segments split from each of the plurality of documents into one or more clusters;
a labeler configured to generate a cluster label for each of the one or more clusters; and
a cluster storage configured to store a cluster database comprising at least one of the cluster label for each of the one or more clusters and the one or more segments grouped into the one or more clusters,
wherein the clusterer is further configured to group the one or more segments by:
generating a segment vector for each of the one or more segments by using a topic modeling method, the segment vector being a vector characterizing a corresponding segment based on words included in the corresponding segment; and
grouping the one or more segments into the one or more clusters based on a segment vector similarity between each of the one or more segments, and
wherein the clusterer is further configured to generate a cluster label for a cluster of the one or more clusters by combining words having a highest simultaneous appearance frequency,
among words included in segments grouped into the cluster, based on simultaneous appearance frequencies of wo or more words in one sentence.

14. The apparatus of claim 13, wherein the topic parser is further configured to generate the topic database by using a topic modeling technique.

15. The apparatus of claim 13, wherein the splitter is further configured to generate a topic vector for each of the one or more sentences included in each of the plurality of documents by using the topic database and split each of the plurality of documents into the one or more segments by using the topic vector.

16. The apparatus of claim 15, wherein the splitter is further configured to generate the topic vector by using an appearance frequency of words that belong to each of the one or more topics in each of the one or more sentences.

17. The apparatus of claim 15, wherein the splitter is further configured to split the plurality of documents into the one or more segments based on a topic vector similarity between adjacent sentences in each of the plurality of documents.

18. An apparatus for generating a narrative of a document, the apparatus comprising one or more processors to implement:
an inputter configured to receive a document;
a topic storage configured to store a topic database comprising one or more topics and words related to each of the one or more topics;
a splitter configured to split the document into one or more segments comprising one or more sentences by using the topic database;
a cluster storage configured to store a cluster database comprising at least one of a cluster label for each of one or more clusters and segments previously collected and grouped into the one or more clusters;
a clusterer configured to group the one or more segments into the one or more clusters; and
a narrative generator configured to generate a label sequence for the one or more segments in accordance with cluster labels for the grouped one or more clusters,
wherein the clusterer is further configured to group the one or more segments by:
generating a segment vector for each of the one or more segments by using a topic modeling method, the segment vector being a vector characterizing a corresponding segment based on words included in the corresponding segment; and
grouping each of the one or more segments into the one or more clusters based on a segment vector similarity between each of the one or more segments and the previously collected segments, and
wherein each of the cluster labels for a corresponding cluster of the grouped one or more clusters is generated by combining words having a highest simultaneous appearance frequency, among words included in segments grouped into the corresponding cluster, based on simultaneous appearance frequencies of wo or more words in one sentence.

19. The apparatus of claim 18, wherein the splitter is further configured to generate a topic vector for each sentence included in the document by using the topic database and split the document into the one or more segments by using the topic vector.

20. The apparatus of claim 19, wherein the splitter is further configured to generate the topic vector by using an appearance frequency of words that belong to each of the one or more topics in each of the one or more sentences.

21. The apparatus of claim 19, wherein the splitter is further configured to split
   the document into the one or more segments based on a topic vector similarity between adjacent sentences in the document.

* * * * *